(12) United States Patent
Khan et al.

(10) Patent No.: US 8,378,840 B2
(45) Date of Patent: Feb. 19, 2013

(54) SURFACE COMMUNICATION DEVICE AND METHOD FOR DOWNHOLE TOOL

(75) Inventors: Alamzeb Hafeez Khan, Austin, TX (US); Gregory Edward Leuenberger, Montgomery, TX (US); Kevin William Clark, Montgomery, TX (US); Colin Robert Kollker, Montgomery, TX (US); Brett Herbert Stanes, Spring, TX (US)

(73) Assignee: National Oilwell Varco, L.P., Houston, TX (US)

( * ) Notice: Subject to any disclaimer, the term of this patent is extended or adjusted under 35 U.S.C. 154(b) by 518 days.

(21) Appl. No.: 12/684,197

(22) Filed: Jan. 8, 2010

(65) Prior Publication Data

US 2011/0169656 A1    Jul. 14, 2011

(51) Int. Cl.
*G01V 3/00* (2006.01)
(52) U.S. Cl. ............. 340/854.6; 340/854.3; 340/854.9; 340/853.1
(58) Field of Classification Search ............ 340/853.1, 340/854.3, 854.6, 854.9; 175/40
See application file for complete search history.

(56) References Cited

U.S. PATENT DOCUMENTS

| | | | |
|---|---|---|---|
| 4,736,204 A * | 4/1988 | Davison | 340/853.1 |
| 5,558,153 A | 9/1996 | Holcombe et al. | 166/373 |
| 5,819,854 A | 10/1998 | Doane et al. | 166/373 |
| 6,148,263 A | 11/2000 | Brooks et al. | 702/6 |
| 6,283,227 B1 | 9/2001 | Lerche et al. | 175/4.55 |
| 6,684,953 B2 | 2/2004 | Sonnier | 166/255.3 |
| 6,831,571 B2 | 12/2004 | Bartel | 340/854.6 |
| 7,136,709 B2 | 11/2006 | Arling et al. | |
| 2002/0039069 A1 | 4/2002 | Chance | |
| 2006/0219438 A1 | 10/2006 | Moore et al. | 175/50 |
| 2006/0254764 A1 | 11/2006 | Zuilekom | 166/66 |
| 2007/0168132 A1 | 7/2007 | Yu et al. | 702/6 |
| 2008/0024319 A1 | 1/2008 | Close | |
| 2009/0184841 A1 | 7/2009 | Gardiner | |

OTHER PUBLICATIONS

International Application No. PCT/US2011/020188, International Search Report and Written Opinion dated Mar. 3, 2011, 17 pages.

* cited by examiner

*Primary Examiner* — Jean B Jeanglaude
(74) *Attorney, Agent, or Firm* — Conley Rose, P.C.

(57) ABSTRACT

A device for communicating with a downhole measurement tool includes a processor module comprising a set of commands and configured to issue a command from the set to the downhole tool and receive a corresponding reply from the downhole tool. The set of commands includes at least one of a command to switch the downhole measurement tool between a sleep mode and an active mode and a command to download data from the downhole measurement tool. The device includes a transceiver module coupled to the processor module and an antenna coupled to the transceiver module. The antenna and transceiver module are configured to transmit commands and replies between the processor module and the downhole measurement tool.

24 Claims, 2 Drawing Sheets

SURFACE COMMUNICATION DEVICE AND METHOD FOR DOWNHOLE TOOL

TECHNICAL FIELD

The present invention relates generally to methods and apparatus for communicating with downhole measurement tools designed to collect data about downhole parameters in a borehole. The present invention relates more particularly to methods and apparatus for communicating with downhole measurement tools while the downhole measurement tools are at the surface.

BACKGROUND

Drilling operators logically need as much information as possible about borehole and formation characteristics while drilling a borehole for safety and reserves calculations. If problems arise while drilling, minor interruptions may be expensive to overcome and, in some cases, pose a safety risk. Since current economic conditions provide little margin for error and cost, drilling operators have a strong incentive to fully understand downhole characteristics and avoid interruptions.

Downhole measurement tools, often referred to as measurement while drilling tools or logging while drilling tools, are used to collect data about downhole parameters in a borehole during drilling of the borehole. The collected data can be used to make various interpretations about conditions downhole and to adjust the drilling operation. The downhole measurement tools may be disposed at various points along the drill string used in drilling the borehole in order to collect data about downhole parameters at various points along the borehole.

The downhole measurement tool typically arrives at the drill site as a drill string part ready to be included in a drill string. For example, the downhole measurement tool may arrive at the drill site mounted on or inside a drill bit, which will become part of the drill string. Or, the downhole measurement tool may arrive in the form of a pipe joint to be included in the drill string. To conserve battery power, the downhole measurement tool, after configuration as a drill string part, may be in a sleep mode. Before the downhole measurement tool can be used, the downhole measurement tool would have to be switched from the sleep mode to the active mode. To save time, it is desirable that the downhole measurement tool can be switched from the sleep mode to the active mode without altering the ready-to-use configuration of the downhole measurement tool. For example, if the downhole measurement tool is already mounted on or inside a drill bit or otherwise attached to a drill string, it would be desirable that the downhole measurement tool can be switched from the sleep mode to the active mode without dismantling the downhole measurement tool from the drill bit or drill string.

The downhole measurement tool typically includes a storage device for storing the data collected in the borehole. The collected data can be sent to the surface while the downhole measurement tool is in the borehole. Alternatively, the collected data may be downloaded from the storage device when the downhole measurement tool is retrieved to the surface. To save time, it is desirable that the collected data can be downloaded from the downhole measurement tool without altering the ready-to-use configuration of the downhole measurement tool or dismantling the downhole measurement tool from the drill string.

U.S. Pat. No. 6,831,571 (Bartel) describes a method for transferring data from a logging tool to a surface computer that involves attaching a standalone data dump device to the logging tool after the logging tool has collected data about downhole parameters and is raised to the surface. The data dump device includes an enclosure inside of which is disposed a data dump memory and a processor. The data dump device also includes a connector to couple the processor to the memory and to attach the enclosure to the logging tool. The data dump device includes a transmitter/receiver circuit coupled to the processor, where the transmitter/receiver circuit allows communication between the data dump device and a surface computer. The data dump device is designed to be physically connected to the logging tool in order to download data from the logging tool.

In U.S. Pat. No. 6,831,571, where the ready-to-use configuration of the logging tool is such that the logging tool is mounted in a hard-to-reach area, e.g., inside a drill bit, it would be difficult or impossible to make a reliable physical connection between the data dump device and the logging tool.

SUMMARY

In a first aspect, the present invention relates to a device for communicating with a downhole measurement tool. The device comprises: a processor module comprising a set of commands and configured to issue a command from the set to the downhole measurement tool and receive a corresponding reply from the downhole measurement tool, the set of commands comprising at least one of a command to switch the downhole measurement tool between a sleep mode and an active mode and a command to download data from the downhole measurement tool; a transceiver module coupled to the processor module; and an antenna coupled to the transceiver module, the antenna and transceiver module being configured to transmit commands and replies between the processor module and the downhole measurement tool.

In certain embodiments of the first aspect of the present invention, the transceiver module is a communications module using the electromagnetic spectrum.

In certain embodiments of the first aspect of the present invention, the commands further comprise a command to erase selected data from the downhole measurement tool.

In certain embodiments of the first aspect of the present invention, the commands further comprise a command to check a battery status of the downhole measurement tool.

In certain embodiments of the first aspect of the present invention, the antenna is selected from a flexible antenna, a patch antenna, and an on-chip antenna.

In certain embodiments of the first aspect of the present invention, the device further comprises an input module, the input module comprising at least one touch sensor coupled to the processor module, the at least one touch sensor being configured to cause the processor module to issue a command to the downhole measurement tool.

In certain embodiments of the first aspect of the present invention, the device further comprises an indicator module, the indicator module comprising at least one light-emitting diode (LED) coupled to the processor module, the at least one LED being configured to indicate a state of the downhole measurement tool.

In certain embodiments of the first aspect of the present invention, the device further comprises a display module, the display module being coupled to the processor module and comprising a screen for displaying information from the processor module.

In certain embodiments of the first aspect of the present invention, the device further comprises an interface adapter coupled to the processor module and providing a port for communication between the processor module and a peripheral device.

In certain embodiments of the first aspect of the present invention, the interface adapter provides at least one of a universal serial bus (USB) port, a memory card port, and a serial port.

In certain embodiments of the first aspect of the present invention, the device further comprises a real-time clock module coupled to the processor module.

In certain embodiments of the first aspect of the present invention, the device is configured for communication with the downhole measurement tool while the downhole measurement tool is coupled to a drill string or a component of a drill string.

In a second aspect, the present invention relates to a method of communicating with a downhole measurement tool. The method comprises: (a) sending a command to the downhole measurement tool from a surface location via a wireless link, the command being selected from a set of commands comprising at least one of a command to switch the downhole measurement tool between a sleep mode and an active mode and a command to download data from the downhole measurement tool; (b) waiting for a time period to receive a reply from the downhole measurement tool via the wireless link; (c) interpreting the reply if received to determine whether the downhole measurement tool successfully executed the command sent in step (a); and (d) displaying a state of the downhole measurement tool.

In certain embodiments of the second aspect of the present invention, step (d) is based on a result of step (c).

In certain embodiments of the second aspect of the present invention, step (d) comprises activating a light-emitting diode.

In certain embodiments of the second aspect of the present invention, step (d) comprises displaying the state on a screen.

In certain embodiments of the second aspect of the present invention, in steps (a) and (b), the wireless link is a communications link using the electromagnetic spectrum.

In certain embodiments of the second aspect of the present invention, step (a) occurs while the downhole measurement tool is installed in or on a drill bit.

In certain embodiments of the second aspect of the present invention, in step (a), a command to download data from the downhole measurement tool is sent to the downhole measurement tool, and the method further comprises: (e) storing data contained in the reply in a storage device after step (b).

In certain embodiments of the second aspect of the present invention, in step (e), the storage device is accessed via one of a universal serial bus (USB) port, a memory card port, and a serial port.

In certain embodiments of the second aspect of the present invention, in step (a), a command to upload data to the downhole measurement tool is sent to the downhole measurement tool.

In certain embodiments of the second aspect of the present invention, the method further comprises: (f) retrieving the data to be uploaded to the downhole measurement tool from a storage device through one of a universal serial bus (USB) port, a memory card port, and a serial port.

In certain embodiments of the second aspect of the present invention, in step (f), the data retrieved from the storage device comprises a tool configuration profile for the downhole measurement tool.

In certain embodiments of the second aspect of the present invention, step (a) occurs while the downhole measurement tool is at a surface location.

Advantages and other aspects of the present invention will be apparent from the following description and the appended claims.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
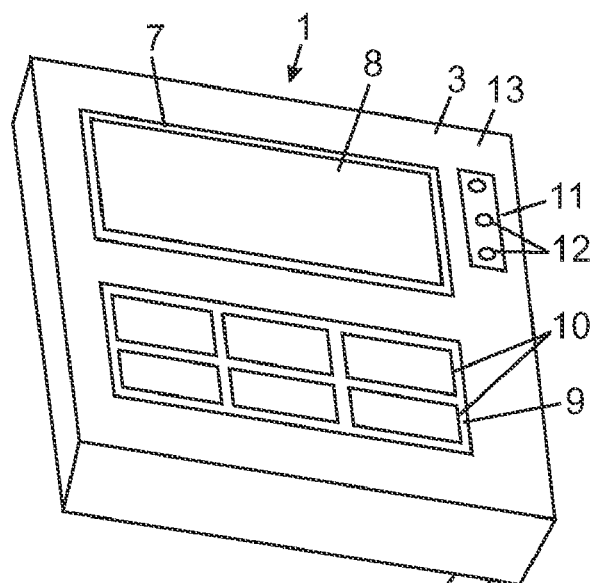
FIG. 1 is a perspective view of a device for communicating with a downhole measurement tool.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

FIG. 1 is a perspective view of a device 1 for communicating with a downhole measurement tool. In certain aspects, the downhole measurement tool is configured to collect data about downhole parameters in a borehole. Typically, the downhole measurement tool would include one or more sensors for collecting the data. Sensors that may be included in a downhole measurement tool are, for example, axially spaced resistivity, caliper, acoustic, rock strength (sonic), pressure sensors, temperature sensors, seismic devices, strain gauges, inclinometers, magnetometers, accelerometers, bending, vibration, neutron, gamma, gravimeters, rotation sensors, and flow rate sensors. But the particular nature of the measurement to be made by the downhole measurement tool is not critical here.

The device 1 can communicate with the downhole measurement tool while the downhole measurement tool is at the surface and the downhole measurement tool is configured as a drill string part or attached to a drill string. The device 1 may also communicate with the downhole measurement tool while the downhole measurement tool is in a borehole, provided the downhole measurement tool is within the communication range of the device 1. The downhole measurement tool may initially be in a sleep mode. The device 1 is equipped to switch the downhole measurement tool from the sleep mode to the active mode. At a later time, the device 1 may also be used to switch the downhole measurement tool from the active mode into the sleep mode. The downhole measurement tool may be lowered into a borehole to collect data inside the borehole. After the downhole measurement tool has been retrieved to the surface with the collected data, the device 1 can be used to download the collected data from the downhole measurement tool.

Figure 2:
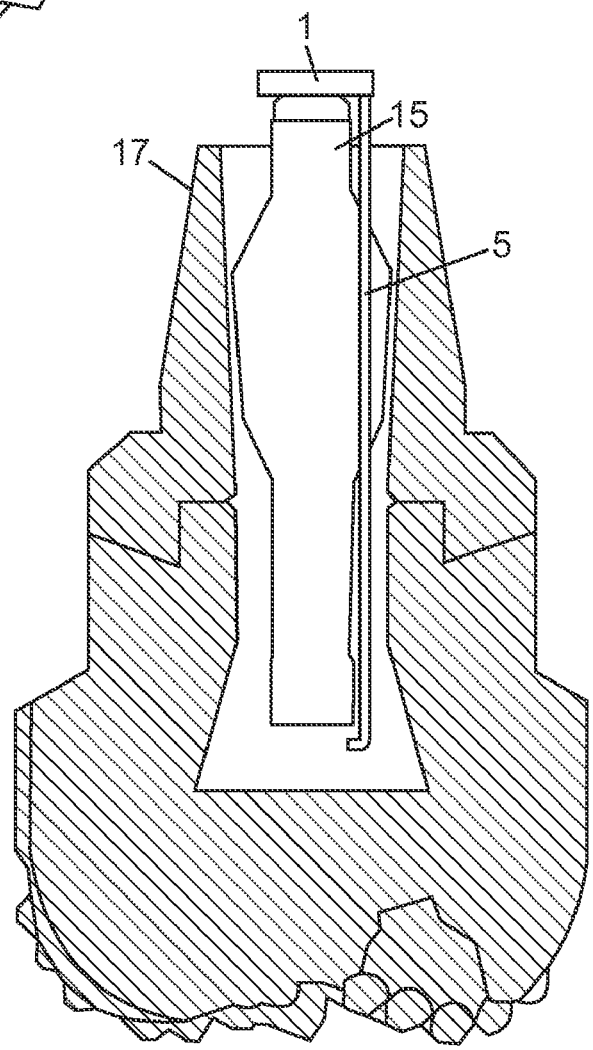
FIG. 2 is a cross-sectional view of a downhole measurement tool in communication with the device of FIG. 1.

FIG. 2 shows the device 1 in communication with a downhole measurement tool 15 via an antenna 5. In the example of FIG. 2, the downhole measurement tool 15 is mounted inside a drill bit 17. However, this is not the only place in a drill string where a downhole measurement tool could be located while communicating with the device 1, and the device 1 does not have to be mounted on the downhole measurement tool 15 as shown in FIG. 2. The device 1 can be held by hand, for example, or placed on any other surface. For communication with any downhole measurement tool, it is desirable to place the device 1 as close as possible to the downhole measurement tool.

Figure 3:
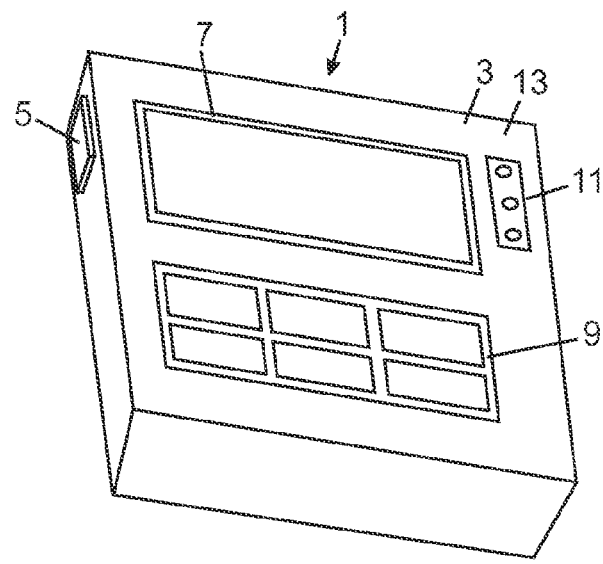
FIG. 3 is a perspective view of the device of FIG. 1 with a patch antenna.

Returning to FIG. 1, the device 1 includes an enclosure 3. The enclosure 3 could be made of a durable material, such as metal or hard plastic. In FIG. 1, the antenna 5 is mounted on the enclosure 3 and shown in an extended position. The antenna 5 may be mounted on the enclosure 3 via a pivot joint so that it can be folded against the enclosure 3 when not in use. The antenna 5 may even be detachable from the enclosure 3. The antenna 5 is for transmission of commands and replies between the device 1 and the downhole measurement tool. In certain embodiments, the antenna 5 may be a flexible antenna so that it can be placed in close proximity to the downhole measurement tool when the downhole measurement tool is disposed in a hard-to-reach area, such as inside a drill bit (see, e.g., FIG. 2 where the antenna 5 is placed in close proximity to the downhole measurement tool 15 in a drill bit 17). The flexible antenna may, for example, be made of a predefined-gauge coaxial cable. Other types of antennas may also be used. For example, a patch antenna (5 in FIG. 3) or an on-chip antenna (which would be inside the enclosure 3) may be used. The antenna 5 is coupled to a transceiver module inside the enclosure 3, as will be further described below.

In this disclosure, the term "module" is used to refer to a component or group of components working together to achieve a common goal. The components may not necessarily be located within the same container but should function synergistically. In describing a module, all the possible components that may be included in the module may not be mentioned to avoid unnecessary bloating of the disclosure. Those skilled in the art would know which components to include in a module based on the intended use of the module. Typically, at least the essential parts of a module will be mentioned in this disclosure.

In certain embodiments, the device 1 includes a display module 7, which is coupled to a processor module inside the enclosure 3, as will be further described below. In certain embodiments, the device 1 includes an input module 9, which is coupled to the processor module inside the enclosure 3, as will be further described below. In certain embodiments, the device 1 includes an indicator module 11, which is coupled to the processor module inside the enclosure 3, as will be further described below. The display module 7, input module 9, and indicator module 11, when present in the device 1, may or may not be directly attached to the enclosure 3. In general, the display module 7, input module 9, and indicator module 11, when present in the device 1, are disposed at least partially in the enclosure 3 and accessible from a surface 13 of the enclosure 3.

Figure 4:
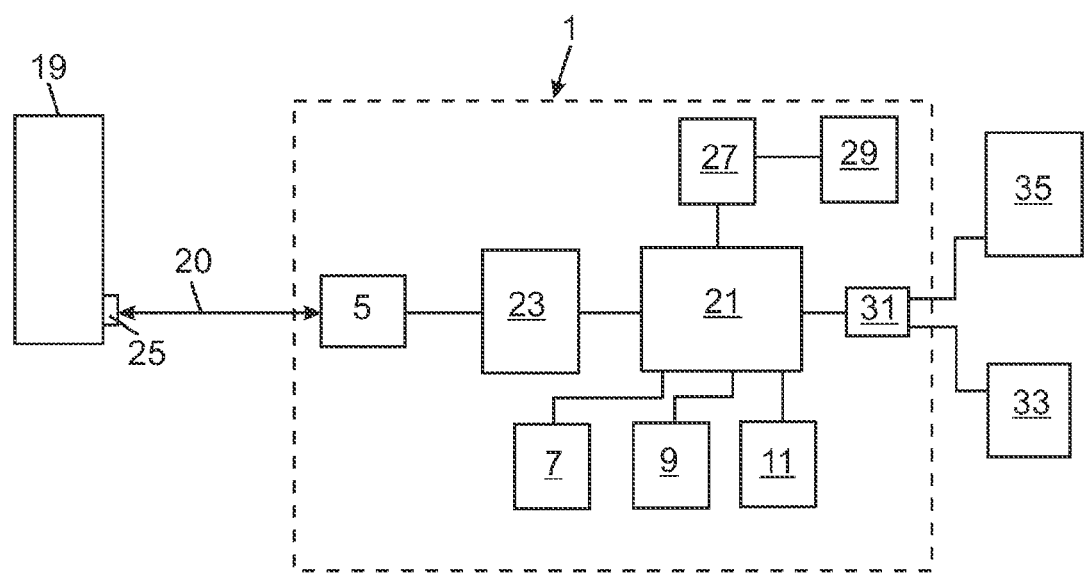
FIG. 4 is a block diagram of a communication system including the device of FIG. 1 and a downhole measurement tool.

FIG. 4 shows a block diagram of the device 1 in communication with a downhole measurement tool 19, as indicated by double-headed arrow 20. The downhole measurement tool 19 may have a suitable combination of the properties described above for a downhole measurement tool. The device 1 includes a processor module 21, as mentioned above. The processor module 21 can be any device capable of processing/interpreting instructions. The processor module 21 includes at least a processor for processing/interpreting instructions and at least a memory for storing the instructions (the processor and memory are not shown separately). In certain embodiments, the processor module 21 may be a microcontroller. In certain embodiments, the processor included in the processor module 21 may be a central processing unit (CPU) or microprocessor. The processor module 21 may be coupled to a real-time clock module 27, which may be powered by a battery 29. The processor module 21 may include other components relevant to efficient processing/interpreting of instructions as well as communication with other modules coupled to the processor module 21.

The device 1 includes a transceiver module 23, which is coupled to the processor module 21 and the antenna 5. If the antenna 5 is an on-chip antenna, it may be integrated with the transceiver module 23 into a single module, and the single module may be regarded as a radio. The transceiver module 23 includes a transmitter circuit and a receiver circuit or a transceiver circuit (none of which is shown separately). The transceiver module 23 may be any communications module using the electromagnetic spectrum, e.g., radio frequency transceiver module, wireless transceiver module, electromagnetic communications module, or low-frequency transceiver module. In certain embodiments, the transceiver module 23 is based on radio frequency (RF) technology. The RF technology may in some embodiments implement a wireless protocol such as Bluetooth or ZigBee. A transceiver module 23 based on RF technology may include, for example, RF transmitter/receiver, RF synthesizer, full baseband logic, and a host controller interface. In general, the actual configuration of the transceiver module 23 will depend on the flavor of RF technology it is using. Typically, the housing of the downhole measurement tool 19 is made of steel. To allow for transmission of signals from the transceiver module 23 to the interior of the downhole measurement tool 19, the housing of the downhole measurement tool 19 may be provided with a port 25 that is transparent to signals from the transceiver module 23. Physically, the port 25 may be a portion of the housing that is made of a material that is transparent to signals from the transceiver module 23. As an example, the port 25 could be made of a transparent machinable material such as Macor® Machinable Glass Ceramic, available from Corning Incorporated.

The processor module 21 may be coupled to a display module 7, as mentioned above. The display module 7 is for displaying information from the processor module 21. The display module 7 may be any suitable display device having a screen (8 in FIG. 1), such as, for example, a thin-film transistor (TFT) liquid crystal display (LCD). The processor module 21 may be coupled to an input module 9, as mentioned above. The input module 9 is for user interaction with the processor module 21. The input module 9 may include, for example, push buttons or an array of touch sensors (10 in FIG. 1). The touch sensors may be selected from, for example, capacitive sensors and resistive sensors. The display module 7 and input module 9 may be integrated into a single module in certain embodiments, i.e., may be based on touch screen technology.

The processor module 21 may be coupled to the indicator module 11, as mentioned above. The indicator module 11 is for indicating the state of the downhole measurement tool 19, as expressed in a reply received or not received from the downhole measurement tool 19 by the processor module 21. Any suitable means of visually indicating a state of the downhole measurement tool 19 may be used. The indicator module 11 may in certain embodiments include an array of light-emitting diodes (LEDs) (12 in FIG. 1). Differently-colored LEDs may be used to indicate different states of the downhole measurement tool 19. States may encompass the power mode, e.g., sleep or active, of the downhole measurement tool 19 and whether or not the downhole measurement tool 19 successfully received a command from the processor module 21 and successfully executed the command.

In certain embodiments, the processor module 21 may be coupled to an interface adapter 31 to allow communication with peripheral devices, such as a storage device 33 or a surface computer 35. In certain embodiments, the interface adapter 31 may be a universal serial bus (USB) host controller that provides one or more USB ports for connection to peripheral devices. The interface adapter 31 may also provide one or more memory card ports, for example, but not limited to, secure digital (SD) card port, micro SD card port, mini SD card port. The interface adapter 31 may also provide one or more serial ports, for example, but not limited to, recommended standard 232 (RS-232) port, serial peripheral interface (SPI) port, and universal asynchronous receiver/transmitter (UART) port.

Interactions between the device 1 and the downhole measurement tool 19 take place while the downhole measurement tool 19 is at the surface. As mentioned previously, it is also possible for the device 1 to interact with the downhole measurement tool 19 while the downhole measurement tool 19 is in the borehole. Typically, the device 1 will not interact with the downhole measurement tool 19 while drilling. The downhole measurement tool may be coupled to a drill string or a component of a drill string while in communication with the device 1. The processor module 21 is configured to issue commands to the downhole measurement tool 19 at the surface and to receive replies from the downhole measurement tool 19 at the surface. In certain embodiments, the commands include a command to switch the downhole measurement tool 19 from a sleep mode to an active mode. In certain embodiments, the commands include a command to switch the downhole measurement tool 19 from an active mode to a sleep mode. In certain embodiments, the commands include a command to download data from the downhole measurement tool 19. If the downhole measurement tool 19 replies with the requested data, the processor module 21 may store the requested data in the storage device 33, which may be accessed through a port, e.g., USB port, provided by the interface adapter 31. In certain embodiments, the commands include a command to erase selected data from the downhole measurement tool 19, e.g., after the selected data has been downloaded from the downhole measurement tool 19. In certain embodiments, the commands include a command to check the battery status of the downhole measurement tool 19. In certain embodiments, the commands include a command to upload data to the downhole measurement tool 19. The data to upload may be, for example, a new tool configuration profile for the downhole measurement tool 19. The data to upload to the downhole measurement tool 19 may be stored on an external device, such as a USB storage, that can be accessed by the processor module 21 via a port, e.g., a USB port, provided by the interface adapter 31. The processor module 21 would send the command along with the requisite data to the downhole measurement tool 19. In general, each command issued to the downhole measurement tool 19 by the processor module 21 may be made up of one or more requests to be processed by the downhole measurement tool 19 and may be accompanied by data.

A user can cause the processor module 21 to issue a command to the downhole measurement tool 19 through the input module 9. For each command issued to the downhole measurement tool 19, the processor module 21 may receive a reply from the downhole measurement tool 19 and interpret the reply. If the interpretation of the reply indicates that the command was successfully executed, the processor module 21 may use the indicator module 11 to alert the user that the command was successfully executed. For example, the processor module 21 may activate a green LED if the command was successfully executed. On the other hand, if the interpretation of the reply indicates that the command was not successfully executed, the processor module 21 may use the indicator module 11 to alert the user that the command was not successfully executed. For example, the processor module 21 may activate a yellow LED if the command was not successfully executed. In instances where the processor module 21 expects a reply and does not receive a reply, the processor module 21 may conclude that the downhole measurement tool 19 is not operating properly and use the indicator module 11 to alert the user of the state of the downhole measurement tool 19. For example, the processor module 11 may activate a red LED if a reply was not received from the downhole measurement tool 19.

The processor module 21 may also use the screen of the display module 7 to display messages to the user about interactions it is having with the downhole measurement tool 19. It is possible to have the device 1 without the display module 7, the input module 9, and the indicator module 11. In this case, interactions with the device 1 can be via the surface computer 35. Also, data downloaded from the downhole measurement tool 19 can be stored in an external storage device, e.g., storage device 33, or on the surface computer 35.

In a method of using the device 1, the processor module 21 sends a command to the downhole measurement tool 19 via a wireless link provided by the transceiver module 23 and antenna 5 (and corresponding structure in the downhole measurement tool 19) while the downhole measurement tool 19 is at the surface (or in the borehole). Transmission of a command to the downhole measurement tool 19 may require transmission of one or more signals to the downhole measurement tool 19. The processor module 21 waits for a period of time for a reply from the downhole measurement tool 19 and receives the reply from the downhole measurement tool 19. A reply would generally indicate whether the command was successfully executed and include any data requested in the command. Transmission of a reply to the device 1 may require transmission of one or more signals to the device 1, particularly when the reply contains data. The reply would be received by the device 1 through the wireless link. The wireless link may be a radio-frequency link or other suitable link, e.g., Bluetooth or ZigBee, as previously discussed.

The method includes indicating a state of the downhole measurement tool 19. The state of the downhole measurement tool 19 may be extracted from the reply from the downhole measurement tool 19 or deduced from non-responsiveness of the downhole measurement tool 19. Examples of states of the downhole measurement tool 19 include, but are not limited to, the tool is in active mode, the tool is in sleep mode, the battery capacity of the tool is below a predefined threshold, the battery capacity of the tool is above a predefined threshold, data has been successfully downloaded from the tool, data has been successfully uploaded to the tool, and data has been erased from the tool. As mentioned above, the processor module 21 typically waits for a reply from the downhole measurement tool 19 before giving up on the tool. If the processor module 21 does not receive a reply within the set time period, the processor module 21 can alert the user of a problem with the downhole measurement tool 19. If the processor module 21 receives a reply within the set time period, the processor module 21 may interpret the reply and alert the user of successful or non-successful execution of the command. The processor module 21 may alternately send the reply to the surface computer 35 for interpretation.

The process of sending a command to the downhole measurement tool 19 and receiving a reply from the downhole measurement tool 19 may be repeated until a specific task is completed. Each command sent to the downhole measurement tool 19 is selected from a set of commands preprogrammed into the processor module 21. Examples of commands that may be included in the set have been described above, e.g., a command to switch the power mode of the downhole measurement tool (i.e., from sleep to active or vice versa), a command to download data from the downhole measurement tool, a command to erase selected data from the downhole measurement tool, a command to upload data, e.g., new tool configuration profile, to the downhole measurement tool, and a command to check the battery capacity status of the downhole measurement tool. Typically, during the course of operating the device 1, at least one of a command to switch the downhole measurement tool 19 between a sleep and active mode and a command to download data from the downhole measurement tool 19 would be issued to the downhole measurement tool 19 by the processor module 21. It goes without saying that the downhole measurement tool 19 must include the necessary circuitry to receive and interpret commands from the device 1.

The processor module 21 may be programmed using any suitable language, e.g., C++, C or Assembly. The processor module 21 may be programmed directly or through a connector, such as a JTAG connector, provided for such a purpose. One of skill in the art with knowledge of the processor module 21 and knowledge of the language the downhole measurement tool 19 understands would be able to program the processor module 21 to operate as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a device for communicating with a downhole measurement tool, comprising:
   a processor module comprising a set of commands and configured to issue a command from the set to the downhole measurement tool and receive a corresponding reply from the downhole measurement tool, the set of commands comprising at least one of a command to switch the downhole measurement tool between a sleep mode and an active mode and a command to download data from the downhole measurement tool;
   a transceiver module coupled to the processor module; and
   an antenna coupled to the transceiver module, the antenna configured to retractably extend from an uphole end of the downhole tool to a downhole end of the downhole tool;
   wherein the antenna and transceiver module are configured to wirelessly transfer commands and replies between the processor module and a wireless transceiver of the downhole measurement tool.

2. The system of claim 1, wherein the transceiver module is a communication module configured to use a radio frequency band of the electromagnetic spectrum to communicate with the downhole measurement tool.

3. The system of claim 1, wherein the set of commands further comprises a command to erase selected data from the downhole measurement tool.

4. The system of claim 1, wherein the set of commands further comprises a command to check a battery capacity status of the downhole measurement tool.

5. The system of claim 1, wherein the antenna is configured to retractably pass between an outer surface of the downhole measurement tool and an inner surface of a drill string downhole tool in which the downhole measurement tool is disposed.

6. The system of claim 1, further comprising an input module, the input module comprising at least one touch sensor coupled to the processor module, the at least one touch sensor being configured to cause the processor module to issue a command to the downhole measurement tool.

7. The system of claim 1, further comprising the downhole measurement tool, wherein the downhole measurement tool comprises a port disposed at the downhole end of the downhole measurement tool, the port comprising a material that is transparent to wireless signals.

8. The system of claim 5, wherein the drill string downhole tool is a drill bit.

9. The system of claim 1, further comprising an interface adapter coupled to the processor module and providing a port for communication between the processor module and a peripheral device.

10. The system of claim 9, wherein the interface adapter provides at least one of a universal serial bus (USB) port, a memory card port, and a serial port.

11. The system of claim 1, further comprising a real-time clock module coupled to the processor module.

12. The system of claim 1, wherein the antenna is configured to extend from the uphole end of the downhole measurement tool to a point beyond the downhole end of the downhole measurement tool and to direct wireless signals provided by the device to the downhole end of the downhole measurement tool from the point beyond the downhole end of the downhole measurement tool.

13. A method of communicating with a downhole measurement tool, comprising:
   removably disposing an antenna along the downhole measurement tool from an uphole end of the downhole measurement tool to a downhole end of the downhole measurement tool;
   wirelessly sending, via the antenna, a command to a wireless transceiver of the downhole measurement tool from a device disposed at a surface location, the command being selected from a set of commands comprising at least one of a command to switch the downhole measurement tool between a sleep mode and an active mode and a command to download data from the downhole measurement tool;
   waiting for a time period to receive a reply from the downhole measurement tool via the antenna;
   interpreting the reply if received to determine whether the downhole measurement tool successfully executed the command; and
   displaying a state of the downhole measurement tool.

14. The method of claim 13, wherein the displaying is based on a result of the interpreting.

15. The method of claim 13, wherein the disposing comprises removably inserting the antenna between an outer surface of the downhole measurement tool and an inner surface of a drill string downhole tool in which the downhole measurement tool is disposed.

16. The method of claim 14, wherein the displaying comprises displaying the state on a screen.

17. The method of claim 13, wherein the wirelessly sending comprises transferring the command via a radio frequency band of the electromagnetic spectrum.

18. The method of claim 13, wherein the wirelessly sending occurs while the downhole measurement tool is disposed inside a drill string downhole tool.

19. The method of claim 13, wherein the command comprises a command to download data from the downhole measurement tool, and further comprising storing data contained in the reply in a storage device.

20. The method of claim 15, wherein the drill string downhole tool is a drill bit.

21. The method of claim 13, wherein the command comprises a command to upload data to the downhole measurement tool.

22. The method of claim 13 wherein the disposing comprises removably extending the antenna from the uphole end of the downhole measurement tool to a point beyond the downhole end of the downhole measurement tool; and wherein the wirelessly sending comprises directing, by the antenna, wireless signals to the downhole end of the downhole measurement tool from the point beyond the downhole end of the downhole measurement tool.

23. The method of claim 21, wherein the data to upload comprises a tool configuration profile for the downhole measurement tool.

24. The method of claim 22, further comprising receiving, by the downhole measurement tool, the wireless signals through a port disposed at the downhole end of the downhole measurement tool, the port comprising a material that is transparent to the wireless signals.

* * * * *